(12) United States Patent
Greenwood et al.

(10) Patent No.: US 10,737,843 B2
(45) Date of Patent: Aug. 11, 2020

(54) REUSABLE MAILER BAG

(71) Applicant: Green 2 Green Products, Inc., Merrick, NY (US)

(72) Inventors: Hugh L. Greenwood, Baldwin, NY (US); Kenneth Greenfield, Merrick, NY (US)

(73) Assignee: GREEN 2 GREEN PRODUCTS, INC., Merrick, NY (US)

( * ) Notice: Subject to any disclaimer, the term of this patent is extended or adjusted under 35 U.S.C. 154(b) by 0 days.

(21) Appl. No.: 16/240,969

(22) Filed: Jan. 7, 2019

(65) Prior Publication Data

US 2019/0135495 A1    May 9, 2019

Related U.S. Application Data

(63) Continuation of application No. 16/023,236, filed on Jun. 29, 2018, which is a continuation-in-part of application No. 14/302,151, filed on Jun. 11, 2014, now Pat. No. 10,011,394.

(51) Int. Cl.
| | |
|---|---|
| *B65D 33/10* | (2006.01) |
| *B65D 27/38* | (2006.01) |
| *B65D 27/14* | (2006.01) |
| *B65D 33/18* | (2006.01) |

(52) U.S. Cl.
CPC ........... *B65D 33/105* (2013.01); *B65D 27/14* (2013.01); *B65D 27/38* (2013.01); *B65D 33/10* (2013.01); *B65D 33/18* (2013.01); *Y02W 30/807* (2015.05)

(58) Field of Classification Search
CPC ...... B65D 33/105; B65D 33/10; B65D 33/18; B65D 27/14; B65D 27/38
See application file for complete search history.

(56) References Cited

U.S. PATENT DOCUMENTS

| | | | |
|---|---|---|---|
| 1,537,956 A | 5/1925 | McNally | |
| 2,068,384 A * | 1/1937 | Newport | ............... F25D 3/14 62/372 |
| 2,103,840 A | 12/1937 | Bauer | |
| 2,197,490 A * | 4/1940 | Williams | ........... B65D 33/1691 383/91 |
| 2,307,902 A | 1/1943 | Vogt | |
| 3,138,985 A | 6/1964 | Mills | |
| 3,784,087 A | 1/1974 | Styers | |
| 4,243,171 A | 1/1981 | Prin | |

(Continued)

*Primary Examiner* — Derek J Battisti

(74) *Attorney, Agent, or Firm* — Carter, Deluca & Farrell LLP

(57) ABSTRACT

A reusable mailer bag includes front, rear, first side, second side, and bottom panels which include interior surfaces that define a carrying volume that has an opening which is opposite the bottom panel. The mailer bag also includes a flap and a first side extension. The flap is configured to extend across the opening to close the carrying volume during shipping. The flap includes a first end portion that is attached to the rear panel and a second end portion that is configured to secure to the front panel. The first side extension extends from a first edge of the second end portion of the flap that is adjacent the first side panel. The first side extension is configured to extend around the first side panel and to secure to the rear panel when the second end portion is secured to the front panel.

17 Claims, 7 Drawing Sheets

(56) References Cited

U.S. PATENT DOCUMENTS

| | | | |
|---|---|---|---|
| 4,421,150 A * | 12/1983 | Masters | A45C 11/22 206/811 |
| 4,729,507 A | 3/1988 | Kim | |
| 4,738,391 A | 4/1988 | Wiseman | |
| 4,818,120 A | 4/1989 | Addiego | |
| 5,370,461 A * | 12/1994 | Smith | B65D 33/06 383/14 |
| 5,429,576 A * | 7/1995 | Doderer-Winkler | B31B 70/00 156/517 |
| 5,492,271 A | 2/1996 | Chereton | |
| 5,503,328 A | 4/1996 | Roccaforte | |
| 6,732,494 B1 | 5/2004 | Nolte | |
| 6,821,018 B1 * | 11/2004 | Denko | A45C 11/22 206/811 |
| 6,913,389 B2 * | 7/2005 | Kannankeril | B65D 31/10 383/110 |
| 7,581,886 B2 * | 9/2009 | Nitti | A45C 3/004 383/109 |
| 7,704,577 B2 | 4/2010 | Shoda | |
| 7,891,490 B2 * | 2/2011 | Raming | B42D 15/006 206/459.5 |
| 8,033,447 B2 | 10/2011 | Katoh | |
| 8,287,188 B2 | 10/2012 | Hoyord et al. | |
| 8,448,828 B2 | 5/2013 | Nitti | |
| 8,590,774 B1 | 11/2013 | Sauer | |
| 8,602,651 B2 | 12/2013 | Nitti | |
| 10,011,394 B2 | 7/2018 | Greenwood et al. | |
| 2002/0164088 A1 | 11/2002 | Collins | |
| 2003/0183680 A1 | 10/2003 | Makofsky | |
| 2007/0017961 A1 * | 1/2007 | Leifer | B65D 27/04 229/68.1 |
| 2009/0266722 A1 | 10/2009 | Rogers | |
| 2009/0304310 A1 | 12/2009 | Nitti | |
| 2010/0051497 A1 | 3/2010 | Meers | |
| 2010/0155279 A1 * | 6/2010 | Wood | B65D 5/062 206/363 |
| 2010/0172603 A1 | 7/2010 | Lin | |
| 2010/0209019 A1 | 8/2010 | Confoy et al. | |
| 2011/0155794 A1 | 6/2011 | Russell | |
| 2012/0145773 A1 | 6/2012 | Petkovsek | |
| 2012/0189228 A1 * | 7/2012 | Grossman | B65D 27/16 383/4 |
| 2013/0075284 A1 * | 3/2013 | Yee | B65D 27/06 206/216 |
| 2014/0209332 A1 | 7/2014 | Burkett | |

* cited by examiner

REUSABLE MAILER BAG

CROSS-REFERENCE TO RELATED APPLICATIONS

This application is a continuation of U.S. patent application Ser. No. 16/023,236, filed Jun. 29, 2018, which is a continuation-in-part of U.S. patent application Ser. No. 14/302,151, filed Jun. 11, 2014, now U.S. Pat. No. 10,011,394. The entire contents of each of the above applications are hereby incorporated by reference.

BACKGROUND

Technical Field

The present disclosure relates to a reusable mailer bag and a method for using a reusable mailer bag.

Background of Related Art

Shipping packaging is typically provided in disposable form for a single use. In particular, boxes, envelopes, and other forms of shipping packaging are often transported from a merchant to an end user and are then subsequently thrown away or recycled by the end user. The end user typically does not gain any lasting value or use from the shipping packaging.

SUMMARY

A reusable mailer bag and a method of use according to aspects of the present disclosure are now described. The reusable mailer bag provides an end user with shipping packaging that may be repurposed for use as a carrying bag. The end user can therefore realize a return value on the cost of shipping.

In accordance with aspects of the present disclosure, a method includes extending a flap attached to a rear panel of a reusable mailer bag over an opening of the reusable mailer bag, securing the flap to a first removable tape layer of a front panel of the reusable mailer bag, detaching the flap from the front panel and the rear panel, and extending a pair of handles from a carrying volume of the reusable mailer through the opening of the reusable mailer.

In an aspect of the present disclosure, detaching the flap from the front panel includes tearing the flap along a first tear strip.

In a further aspect of the present disclosure, detaching the flap from the rear panel includes tearing the flap along a second tear strip.

In another aspect of the present disclosure, the first tear strip includes perforations.

In an aspect of the present disclosure, detaching the flap from the front panel includes detaching the first removable tape layer from the front panel.

In an aspect of the present disclosure, the method further includes attaching a shipping label to a second removable tape layer of the front panel.

In a further aspect of the present disclosure, the method further includes detaching the second removable tape layer from the front panel to remove the shipping label from the front panel.

In another aspect of the present disclosure, detaching the second removable tape layer reveals a hidden surface selected from the group consisting of a promotional code, an advertisement, and a writable surface.

In an aspect of the present disclosure, the reusable mailer bag is non-reversible.

In another aspect of the present disclosure, an interior surface of the carrying volume includes a bubble lined protective layer and the method further includes removing the bubble lined protective layer.

In accordance with aspects of the present disclosure, a reusable mailer bag is disclosed including a front panel, a rear panel, a pair of side panels, and a bottom panel. The panels together define a carrying volume including an opening opposite the bottom panel. A pair of handles is attached to an interior surface of the carrying volume and is configured for positioning entirely within the carrying volume during shipping. The pair of handles is configured to extend out of the opening. A flap is attached to the rear panel at a first end and is configured to extend across the opening to close the opening. The flap includes a second end that is securable to the front panel. The flap is configured to be removed from the mailer bag after shipping.

In an aspect of the present disclosure, the second end of the flap is securable to a first tape layer of the front panel.

In a further aspect of the present disclosure, the first tape layer is removable from the front panel to detach the flap from the front panel.

In another aspect of the present disclosure, the second end of the flap includes an adhesive layer. The adhesive layer is configured to adhere to the first tape layer of the front panel when the second end of the flap is secured to the front panel.

In an aspect of the present disclosure, the front panel further includes a second tape layer configured to receive a shipping label.

In a further aspect of the present disclosure, the front panel includes a hidden surface disposed under the second tape layer. The second tape layer may be removable to reveal the hidden surface. The hidden surface may be selected from the group consisting of a promotional code, an advertisement, and a writable surface.

In another aspect of the present disclosure, the flap includes a first tear strip adjacent the first end. The first tear strip is tearable to detach the flap from the rear panel.

In a further aspect of the present disclosure, the flap includes a second tear strip adjacent the second end. The second tear strip is tearable to detach the flap from the front panel.

In an aspect of the present disclosure, the side panels include recessed portions adjacent the opening. The recessed portions are secured to the front and rear panels adjacent the opening and are recessed relative to side edges of the front and rear panels. The recessed portions are configured to inhibit tampering with the carrying volume when the flap closes the opening.

In a further aspect of the present disclosure, the recessed portions inhibit the reusable mailer bag from being reversed.

In an aspect of the present disclosure, an interior surface of the carrying volume includes a bubble lined protective layer.

In a further aspect of the present disclosure, the bubble lined protective layer is removable.

In another aspect of the present disclosure, a reusable mailer bag includes front, rear, first side, second side, and bottom panels which include interior surfaces that define a carrying volume that has an opening which is opposite the bottom panel. The mailer bag also includes a flap and a first side extension. The flap is configured to extend across the opening to close the carrying volume during shipping. The flap includes a first end portion that is attached to the rear panel and a second end portion that is configured to secure to the front panel. The first side extension extends from a first edge of the second end portion of the flap that is adjacent the first side panel. The first side extension is configured to extend around the first side panel and to secure to the rear panel when the second end portion is secured to the front panel.

In aspects, the mailer bag includes a tape layer that is releaseably secured to the rear panel. The first side extension may be configured to secure to the tape layer to secure to the rear panel.

In some aspects, the mailer bag includes a pair of handles that are attached to the interior surface of the front and rear panels. The pair of handles may be configured to be positioned entirely within the carrying volume during shipping and configured to extend out of the opening for transport.

In certain aspects, the flap is configured to be completely removed from the mailer bag after shipping.

In particular aspects, the mailer bag includes a tape layer that is releaseably secured to the front panel. The second end portion of the flap may be securable to the tape layer. The tape layer may be removable from the front panel to detach the flap from the front panel. The second end portion of the flap may include an adhesive layer. The adhesive layer may be configured to adhere to the tape layer of the front panel to secure the second end portion of the flap to the front panel. The tape layer may be configured to receive a shipping label. The front panel may include a hidden surface that is disposed under the tape layer. The tape layer may be removable to reveal the hidden surface. The hidden surface may be selected from a group of a promotional code, an advertisement, and a writable surface.

In aspects, the flap includes a first tear strip that is adjacent the first end portion that is configured to detach the flap from the rear panel. The flap may include a second tear strip that is adjacent the second end portion and configured to detach the flap from the front panel. The flap may include a third tear strip along the first edge to detach the first side extension from the second end portion. The first, second, and third tear strips may form a continuous tear strip.

In some aspects, the mailer bag includes a second side extension that extends from a second edge of the second end portion that is opposite the first edge. The second side extension may be configured to extend around the second side panel and secure to the rear panel when the second end portion is secured to the front panel.

In another aspect of the present disclosure, a reusable mailer bag includes front, rear, first side, second side, and bottom panels, a flap, and a first side extension. The panels include interior surfaces that define a carrying volume that has an opening opposite the bottom panel. The flap is configured to extend across the opening to close the carrying volume during shipping. The flap includes a first end portion that is attached to the rear panel and a second end portion that is configured to secure to the front panel. The first side extension extends from a first edge of the flap between the first and second end portions adjacent the first side panel. The first side extension is configured to secure to the first side panel when the second end portion that is secured to the front panel.

In aspects, the mailer bag includes a tape layer that is releaseably secured to the first side panel. The lap may be configured to be completely removed from the mailer bag after shipping.

In another aspect of the present disclosure, a reusable mailer bag includes front, rear, first side, second side, and a bottom panel that include interior surfaces which define a carrying volume that has an opening opposite the bottom panel. The side panels include recessed portions that are adjacent the opening such that the side panels are spaced apart from side edges of the front and rear panels adjacent the opening to reduce a length of the opening opposite the bottom panel. A top edge of each of the first and second side panels are attached to each of the front and rear panels spaced apart from the side edges of the front and rear panels. The mailer bag also includes a flap that is formed separate and distinct from the front, rear, first side, second side, and bottom panels. The flap is configured to extend across the opening to close the carrying volume during shipping. The flap includes a first end portion that is attached to the rear panel and a second end portion that is securable to the front panel.

Any of the above aspects and embodiments of the present disclosure may be combined without departing from the scope of the present disclosure.

BRIEF DESCRIPTION OF THE DRAWINGS

Various aspects of the present disclosure are described hereinbelow with reference to the drawings, wherein.

DETAILED DESCRIPTION

Figure 1:
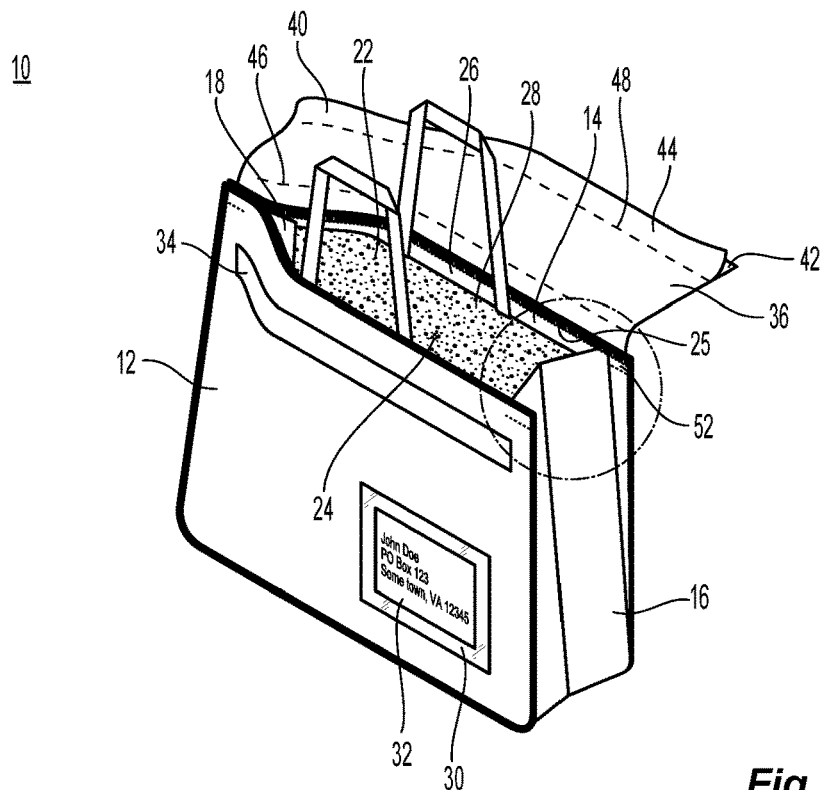
FIG. 1 is a perspective view of a reusable mailer bag provided in accordance with the present disclosure.
Figure 2:
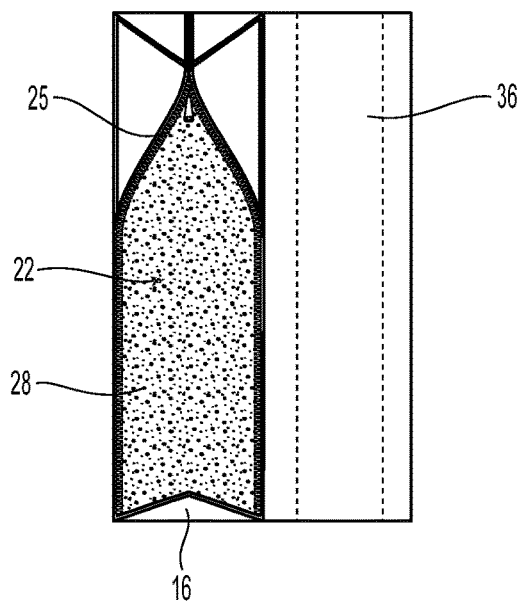
FIG. 2 is a top view of the reusable mailer bag of FIG. 1, illustrating the closure mechanism and the carrying volume.
Figure 6:
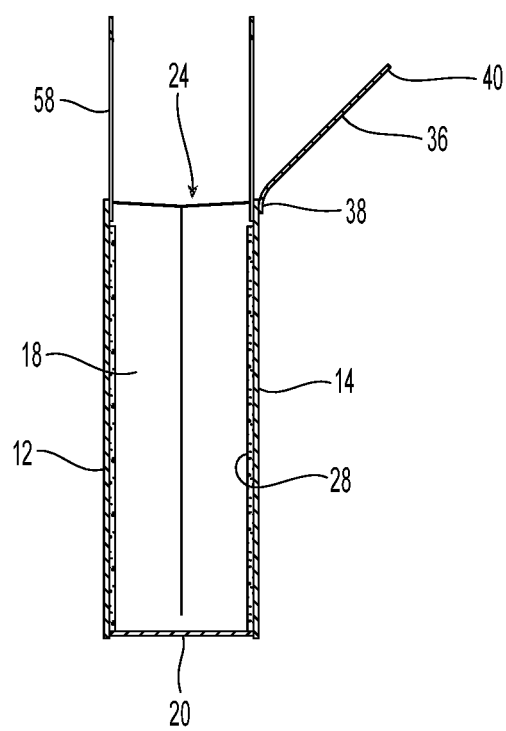
FIG. 6 is a side cross-section view of the reusable mailer bag of FIG. 1.

Referring now to FIG. 1, a mailer bag 10 is provided in accordance with the present disclosure. The mailer bag 10 includes a front panel 12, a rear panel 14, a first side panel 16, a second side panel 18, and a bottom panel 20 (FIG. 6). The panels 12, 14, 16, 18, and 20 are joined together by stitching, gussets, or other similar methods of joining to form a carrying volume 22. An opening 24 opposite the bottom panel 20 provides access to the carrying volume 22. As shown in FIG. 2, carrying volume 22 includes a closure mechanism 25, for example, a zipper, snaps, or other similar forms of closure, adjacent opening 24 that is configured to selectively close opening 24.

Panels 12, 14, 16, 18, and 20 may be formed from a fabric material. For example, panels 12, 14, 16, 18, and 20 may be formed of polypropylene, 120-180 GSM, or other similar materials. The fabric material may be woven or non-woven. The panels 12, 14, 16, 18, and 20 may include various graphical art designs including four color art designs and may include sublimation imprints. The graphical art designs may include advertising. The outer surfaces of panels 12, 14, 16, 18, and 20 may also be laminated to provide resistance to weather elements such as, for example, water. In an embodiment, the outer surfaces of panels 12, 14, 16, 18, and 20 may be formed of or may be laminated with a material that is resistant to common adhesives such as those commonly used with shipping labels. Accordingly, in some embodiments, common adhesives may not be sufficient to secure a shipping label or other materials to the outer surfaces of panels 12, 14, 16, 18, and 20. In this instance a user would adhere the shipping label 32 and flap 36 to the respective tape layers 30 and 34 as described in more detail below.

As shown in FIG. 1, the interior surface 26 of carrying volume 22, i.e., the interior surfaces of panels 12, 14, 16, 18, and 20, may include a plastic bubble lined protection layer 28 for protecting items transported in the carrying volume 22. The protection layer 28 may be removable and may include, for example, perforations, removable adhesive, or other similar features that allow for separation of the protection layer 28 from the interior surface 26 of carrying volume 22.

Figure 3:
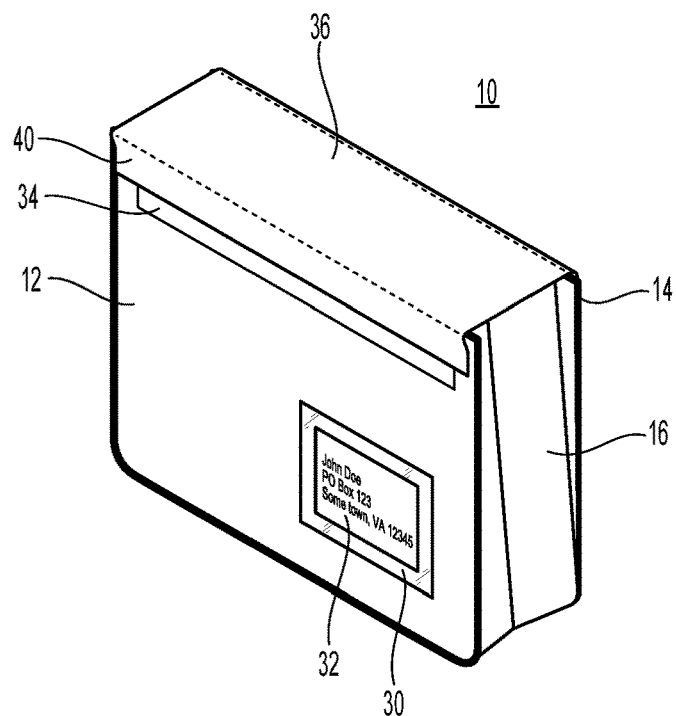
FIG. 3 is a perspective view of the reusable mailer bag of FIG. 1, illustrating the flap extended over the opening and secured to the front panel.
Figure 4:
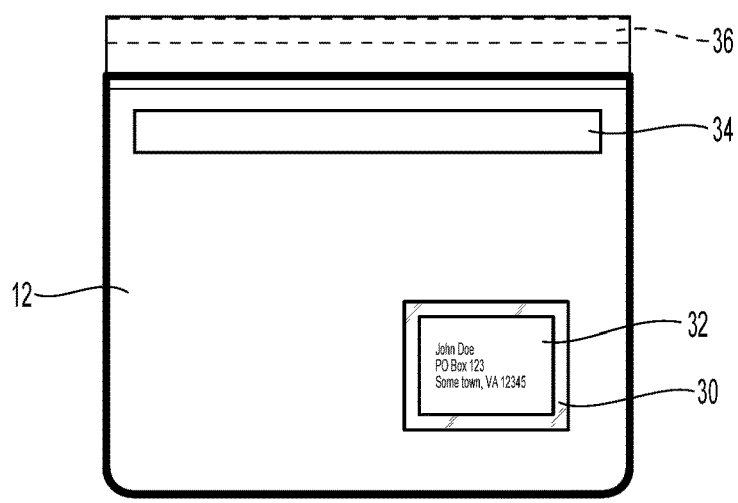
FIG. 4 is a side view of the front panel of the reusable mailer bag of FIG. 1.

As shown in FIGS. 3 and 4, a first tape layer 30 is adhered to front panel 12 and provides an adhesive friendly surface for receiving a shipping label 32. First tape layer 30 may be transparent and may be formed of a plastic material. First tape layer 30 may include an adhesive backing. In an embodiment, the adhesive backing may include an adhesive such as, for example, adhesives sold by 3M Company, that are suitable for adhering to the outer surfaces of panels 12, 14, 16, 18, and 20. In this instance, the particular adhesive of the first tape layer 30 adheres to the panels 12, 14, 16, 18, and/or 20 even if the panels 12, 14, 16, 18, or 20 are made from a material or are coated with a laminate that generally resists common adhesives. Hence, only designated tapes 30, 34 may are adhereable (or adhereable in a substantially secure manner) to the panels 12, 14, 16, 18, and 20 at specified locations.

Figure 7:
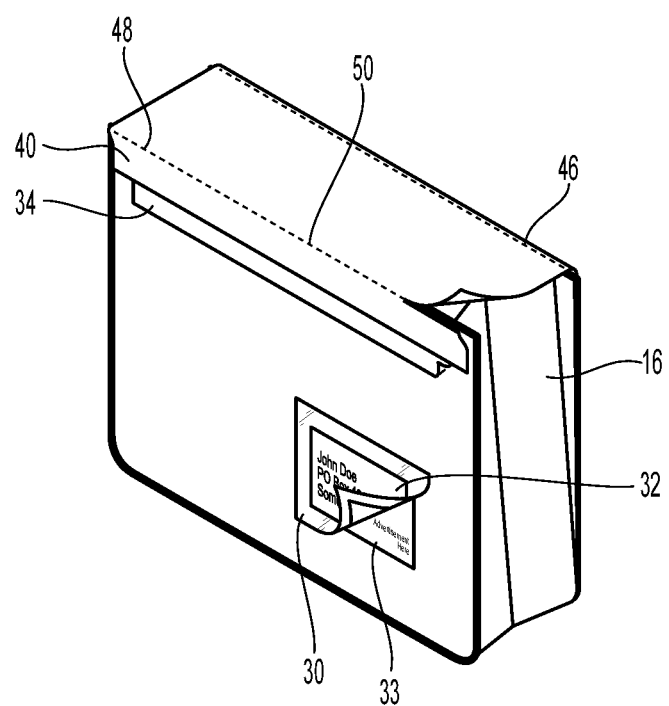
FIG. 7 is a perspective view of the reusable mailer bag of FIG. 2, illustrating partial removal of tape layers and tear strips of the reusable mailer bag.

Shipping label 32 and/or first tape layer 30 may be removable by an end user to reveal a hidden surface 33, as shown, for example, in FIG. 7. For example, in an embodiment, hidden surface 33 may include a promotional code that may be redeemable by the end user online or in a brick and mortar store. In an alternative embodiment, hidden surface 33 may include advertising. In yet another alternative embodiment, hidden surface 33 may include a writable surface on which the end user may take notes. Mailer bag 10 may also include a writing instrument (not shown), such as, for example, an erasable or non-permanent marker, within carrying volume 22 for use by an end user to write on the writable surface.

With continued reference to FIGS. 3 and 4, a second tape layer 34 is adhered to front panel 12 adjacent opening 24 to provide an adhesive friendly surface for receiving attachment of a flap 36. Second tape layer 34 may be transparent and may be formed of a plastic material. Second tape layer 34 may include an adhesive backing. In an embodiment, the adhesive backing may include adhesives such as, for example, adhesives sold by 3M Company, that are suitable for adhering to the outer surfaces of panels 12, 14, 16, 18, and 20. In this instance, the particular adhesive of the first tape layer 30 adheres to the panels 12, 14, 16, 18, and/or 20 even if the panels 12, 14, 16, 18, or 20 are made from a material or are coated with a laminate that generally resists common adhesives. Hence, only designated tapes 30, 34 may be adhereable (or adhereable in a substantially secure manner) to the panels 12, 14, 16, 18, and 20 at specified locations. Rear panel 14 may also include a third tape layer (not shown) similar to second tape layer 34.

First and second tape layers 30 and 34 are removably attached to front panel 12 by the adhesive backing or other similar forms of attachment. In an embodiment, the adhesive backing may include an adhesive that is a different kind of adhesive than that used for shipping label 32 to provide for adhesion to outer surfaces of panels 12, 14, 16, 18, and 20 when the outer surfaces of panels 12, 14, 16, 18, and 20 are resistant to adhesion of common adhesives such as those used for shipping labels.

Flap 36 is attached to rear panel 14 at a first end 38 (FIG. 6) and is configured to extend across the opening 24 to cover opening 24, as shown in FIG. 3. A second end 40 of flap 36 is securable to the second tape layer 34 of front panel 12 by an adhesive strip 42 (FIG. 3). As shown in FIG. 1, flap 36 includes a protective layer 44 covering adhesive strip 42 which is removable from flap 36 prior to securing second end 40 to second tape layer 34 of front panel 12. Flap 36 includes a first tear strip 46 adjacent first end 38 and a second tear strip 48 adjacent second end 40 which are tearable to remove flap 36 from mailer bag 10, as shown, for example, in FIG. 7. First and second tear strips 46 and 48 may include perforations 50. Specifically, the first and second tear strips 46 and 48 may include fine perforations that allow for the clean separation of two portions of the fabric, e.g., two portions of the flap 36, while providing a substantially smooth edge on each of the portions of the fabric. The fine perforations may be created by using needles having a specific size and shape and by creating each perforation a specific distance from adjacent perforations. In embodiments, the perforations are made in a unique pattern to optimize a smooth edge after being torn while maintaining structural integrity during shipping.

Figure 5:
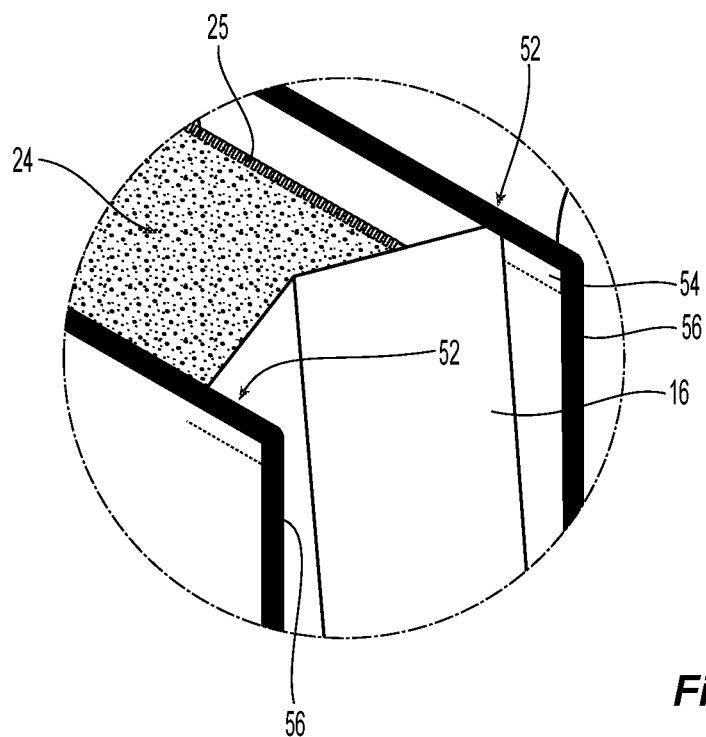
FIG. 5 is an enlarged view of the area of detail depicted in the FIG. 1.

As shown in FIG. 1, each of first and second side panels 16 and 18 includes recessed portions 52 adjacent opening 24 to provide additional protection against pilfering when the flap 36 is secured to front panel 12 to close opening 24. As shown in more detail in FIG. 5, recessed portions 52 are formed by attaching each of side panels 16 and 18 to front and back panels 12 and 14 respectively adjacent opening 24 through the use of stitching, heat welding, or other similar methods, such that side panels 16 and 18 are recessed relative to the side edges 56 of front and back panels 16 and 18. Recessed portions 52 are also configured to inhibit carrying volume 22 and mailer bag 10 from being reversed. In some embodiments, the mailer bag 10 is non-reversible.

As shown in FIGS. 1 and 6, each of front panel 12 and rear panel 14 includes a handle 58, 60 attached to interior surface 26 adjacent opening 24. Handles 58 and 60 are configured to be received entirely within carrying volume 22 and are extendable out of opening 24 when opening 24 is not closed by flap 36.

The use and operation of mailer bag 10 will now be described below.

In an initial state, opening 24 is uncovered with flap 36 attached to rear panel 14, as shown in FIG. 1. An item or product (not shown) to be shipped to an end user, e.g., a customer or consumer, is inserted into carrying volume 22 and a shipping label 32 is applied to the first tape layer 30. Handles 58 and 60 are positioned entirely within carrying volume 22 and the protective layer 44 of flap 36 is removed to expose adhesive strip 42. Flap 36 is then extended across opening 24 to close opening 24, as shown in FIG. 3. Adhesive strip 42 is attached to second tape layer 34 of front panel 12 to secure flap 36 in place. Mailer bag 10 is now prepared for shipping to an end user.

Referring now to FIG. 7, after shipping, once the end user has received mailer bag 10, the flap 36 is removed by tearing along the tear strips 46 and 48 of flap 36. In addition, or alternatively, the second tape layer 34 may be removed from front panel 12 to remove flap 36. In an embodiment, first end 38 of flap 36 may also be removable from rear panel 14 by removing a third tape layer (not shown) on rear panel 14 that is similar to second tape layer 34.

With continued reference to FIG. 7, the end user may remove the shipping label 32 and/or first tape layer 30 to reveal hidden surface 33 which, as described above, may include promotional codes, advertising, or a writable surface.

Once the flap 36 has been removed, handles 58 and 60 may be extended from the carrying volume 22 through opening 24 such that mailer bag 10 is converted into a carrying bag or tote.

In an embodiment, replacement first and second tape layers (not shown) maybe provided or included with mailer bag 10 that are similar to first and second tape layers 30 and 34 may be added to front panel 12 by the end user. A new shipping label 32 may then be attached to the replacement first tape layer to allow for further shipping. In this embodiment, an additional adhesive strip (not shown) and protective layer (not shown) which is similar to adhesive strip 42 and protective layer 44 may be provided on flap 36 adjacent tear strip 46. The flap 36 is partially detached from mailer bag 10 by only tearing along tear strip 46 to provide access to carrying volume 22 through opening 24 and the flap 36 may be extended over opening 24 to close carrying volume 22 once an item to be shipped has been added to carrying volume 22. The additional adhesive strip and protective layer allows flap 36 to be secured to the second replacement tape layer in a similar manner to that described above for adhesive strip 42, protective layer 44, and second tape layer 34 to provide a second closure of the opening 24 for the second shipping. In this manner the mailer bag 10 may be re-used by the end user for shipping another item or product.

Figure 8:
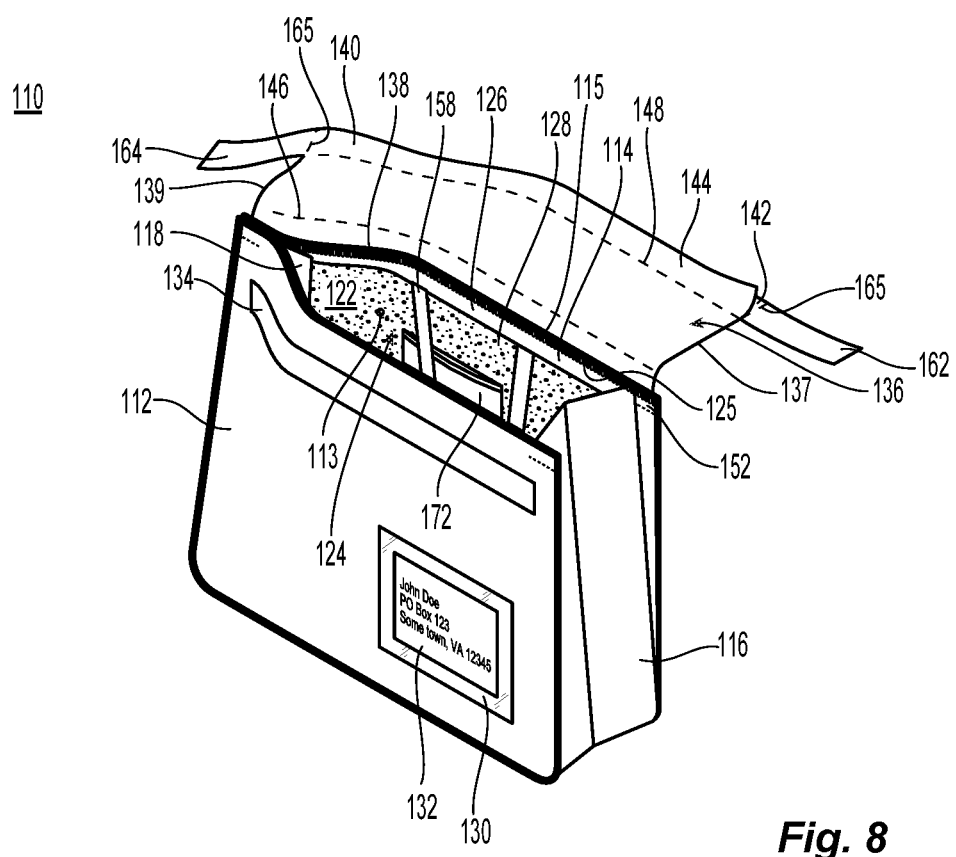
FIG. 8 is a perspective view of another reusable mailer bag provided in accordance with the present disclosure.
Figure 9:
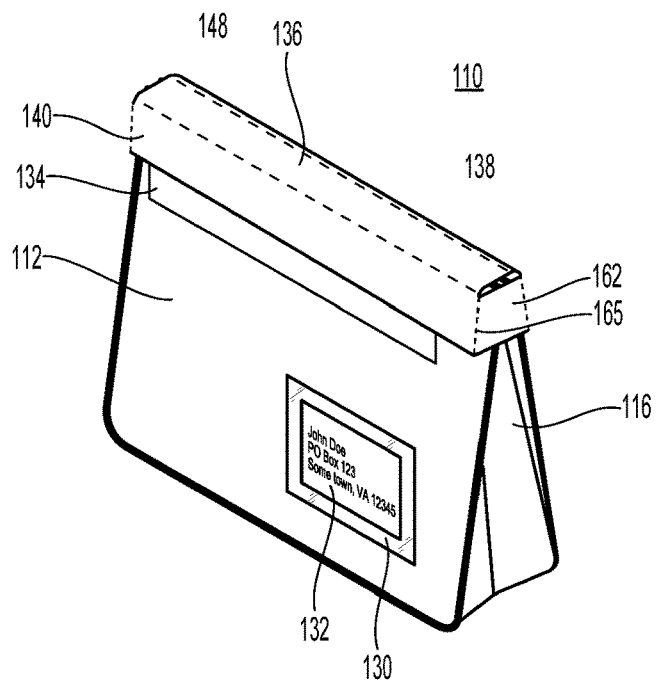
FIG. 9 is a perspective view of the reusable mailer bag of FIG. 8, illustrating a flap extended over an opening of the bag and a side extension secured to a rear panel.
Figure 10:
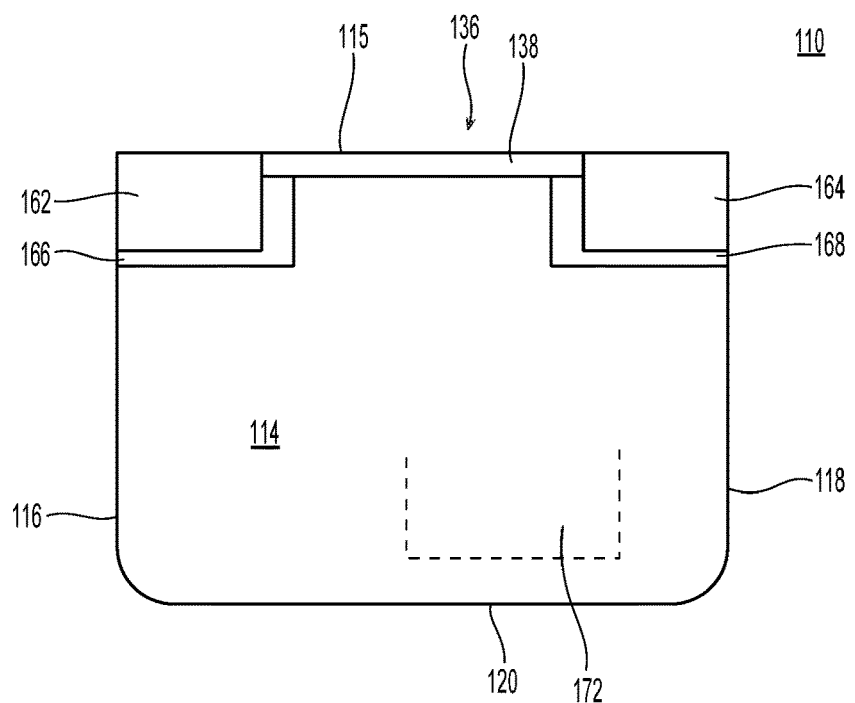
FIG. 10 is a rear view of the reusable mailer bag of FIG. 8.

With reference to FIGS. 8-10, another mailer bag 110 is provided in accordance with the present disclosure. The mailer bag 110 is similar to the mailer bag 10 detailed above with like elements labeled with a similar label with a "1" preceding the previous label and will not be detailed herein for brevity. The mailer bag 110 includes a front panel 112, a rear panel 114, first side panel 116, a second panel 118, and a bottom panel 120 that are joined together by stitching, gussets, adhesives, welding, or other similar methods of joining to form a carrying volume 122.

The mailer bag 110 includes a flap 136 configured to extend across and close an opening 124 of the mailer bag 110, which is opposite the bottom panel 120. The flap 136 includes a first end portion 138, a second end portion 140, a first side flap or extension 162, and a second side flap or extension 164. The first end portion 138 is attached to the rear panel 114 and the second end portion 140 is securable to the front panel 112. The front panel 112 includes a first tape layer 130 and a second tape layer 134 that are releaseably attached to the front panel 112. The second end portion 140 of the flap 136 may be secured to the front panel 112 by the second tape layer 134.

The rear panel 114 may include a third tape layer 166 and a fourth tape layer 168. The third tape layer 166 is adjacent a top edge 115 of the rear panel 114 and the first side panel 116. The fourth tape layer 168 is adjacent the top edge 115 and the second side panel 118. The third and fourth tape layers 166, 168 may form a single continuous tape layer adjacent the top edge 115.

The first side extension 162 extends from a first side edge 137 of the flap 136 and the second side extension 164 extends from a second side edge 139 of the flap 136. In embodiments, the first and second side extensions 162, 164 extend from portions of the first and second side edges 137, 139 entirely along the second end portion 140 of the flap 136. The flap 136 may include tear strips 165 along the first and second side edges 137, 139 where the first and second side extensions 162, 164 meet the first and second side edges 137, 139. The tear strips 165 may form a continuous tear strip with a tear strip 148 between the second end portion 140 and a main portion of the flap 136.

The first and second side extensions 162, 164 are configured to cover portions of the first and second side panels 116, 118, respectively, to prevent tampering with contents in the carrying volume 112 when the mailer bag 110 is sealed for mailing. The first and second side extension 162, 164 may allow for mailer bags having side panels 116, 118 having a dimension along the bottom panel 120 greater than eight inches. For example, the side panels 116, 118 may have a dimension along the bottom portion 120 in a range of about 8 inches to about 14 inches.

In some embodiments, the first and second side extension 162, 164 extend from the first and second side edges 137 of the flap along the first end portion 140 of the flap 136 such that the first and second side extensions 162, 164 extend from the rear panel 114 and releaseably secure to the front panel 112. In such embodiments, the third and fourth tape layers 166, 168 may be disposed on the front panel 112. Alternatively, the third and fourth tape layers 166, 168 may be disposed on a surface of the second end portion 140 opposite a surface of the second end portion 140 that is secured to the front panel 112 such that the first and second side extension 162, 164 are secured directly to the second end portion 140. In embodiments, the first and second side extensions 162, 164 may secure to the second tape layer 134 and include the third and fourth tape layers 166, 168 on a surface opposite the surface that secures the second tape layer 134 such that the second end portion 140 is secured to the second, third, and fourth tape layers 134, 166, 168 to close the opening 124.

The front and/or rear panel 112, 114 may include an internal pocket 172 on an inner surface 113 defining the carrying volume 122. The internal pocket 172 may be formed of a sheet of material secured to the inner surface 113. The internal pocket 172 may allow the items to be secured to the front and/or rear panel 112, 114 and secured separate from the carrying volume 122. For example, a cooling medium, e.g., dry ice, may be secured within the internal pocket 172 to keep the carrying volume 122 at or below a desired temperature during shipping. The internal pocket 172 may include a closure mechanism similar to the closure mechanism 125 to selectively close the internal pocket 172.

In some embodiments, the front, rear, bottom, and/or side panels 112, 114, 116, 118, 120 may be insulated, padded, and/or coated to protect the contents of the carrying volume and/or the mailer bag 110.

Continuing to refer to FIGS. 8-10, the use of the mailer bag 110 to ship one or more items and then to convert the mailer bag 110 into a tote is described in accordance with the present disclosure. The mailer bag 110 may be provided in a flat, folded configuration such that handles 158 of the mailer bag 110 are disposed within a carrying volume 122 of the mailer bag 110. The mailer bag 110 is unfolded such that the carrying volume 122 is accessible through the opening 124. The item or items to be shipped are placed within the carrying volume 122. The item or items may be wrapped in protective packaging. In some embodiments, a cooling medium, e.g., dry ice, may be secured in the internal pocket 172 of the mailer bag 110 before or after the item(s) is placed in the carrying volume 122.

With the item(s) to be shipped are placed within the carrying volume 122, a closure mechanism 125 may be used to close the opening 124 of the mailer bag 110. The closure mechanism 125 may be a zipper, string and eyelets, a hook and loop fastener system, or another suitable closure mechanism. A top portion of each of the front and rear panels 112, 114 are pinched together to close the opening 124 for shipping. As the front and rear panels 112, 114 are pinched together, each of the first and second side panels 116, 118 may be folded into the carrying volume 122. The flap 136 is then folded over the opening 124 and the second end portion 140 is secured to the second tape strip 134. To secure the second end portion 140 to the second tape strip 134, a protective layer 144 may be removed from over an adhesive strip 142 to expose the adhesive strip 142 which is subsequently pressed into the second strip 134 and/or the front panel 112.

The first and second side extensions 162, 164 are then folded over the respective first or second side panel 116, 118 and secured to the respective one of the third or fourth tape strip 166, 168. The first and/or second side extensions 162, 164 may include an adhesive strip and protective layer similar to the adhesive strip 142 and protective layer 144. The first and second side extension 162, 164 further protect access to the carrying volume 122 when the mailer bag 110 is in transit.

The mailer bag 110 may be labeled and shipped in a manner similar to the mailer bag 10 detailed above.

When the mailer bag 110 is received, the first side extension 162, second side extension 164, and/or the flap 136 may be pulled to open the mailer bag 110. Specifically, as the respective one of the extensions 162, 164 or the flap 136 is pulled, the tear strips 146, 148, 165 may rip to allow for access to the carrying volume 122. When the mailer bag 110 includes a closure mechanism 125, the closure mechanism 125 may prevent access to the carrying volume 122 and may also need to be opened, e.g., unzipped, to access the carrying volume 122 after the tear strip or strips 146, 148, 165 are ripped. The tear strips 146, 148, 165 are designed to be able to withstand the rigors of being shipped and to be easily ripped when force is directly applied along or adjacent the respective tear strip 146, 148, 165. In addition, the tear strips 146, 148, 165 are configured rip such that a clean edge remains after the tear strip 146, 148, 165 is ripped. Such a clean edge may be aesthetically preferred to a jagged edge when the mailer bag 110 is reused.

With the carrying volume 122 accessible through the opening 124, the contents may be removed from the carrying volume 122. The mailer bag 110 may then be converted to reusable tote by removing the first, second, third, and/or fourth tape strips 130, 134, 166, 168 from the respective panel to remove any remaining portions of the flap 136, first side extension 162, and/or second side extension 164 from the mailer bag 110. The handles 158 may then be pulled from within the carrying volume 122 such that the mailer bag 110 is converted into a reusable tote. As a reusable tote, the closure mechanism 125 may be used to close the carrying volume 122.

Figure 11:
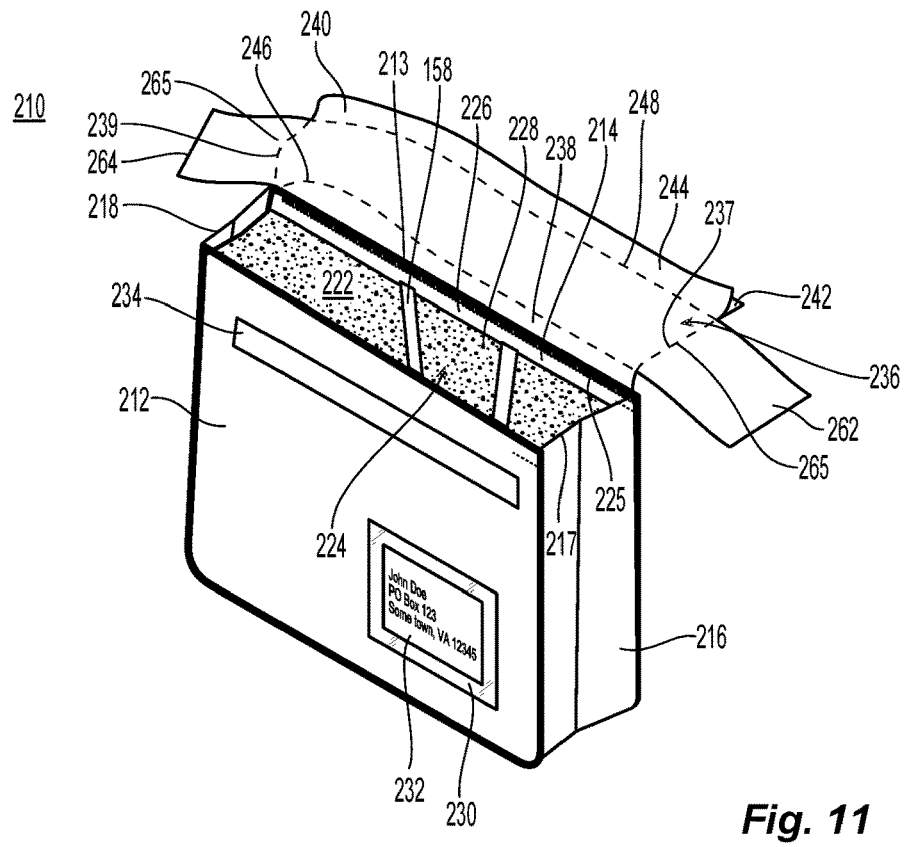
FIG. 11 is a perspective view of another reusable mailer bag provided in accordance with the present disclosure.
Figure 12:
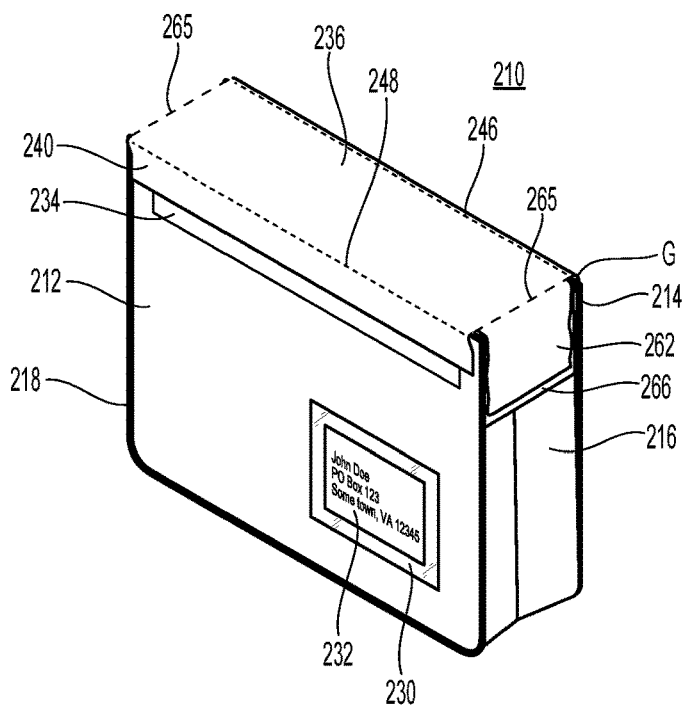
FIG. 12 is a perspective view of the reusable mailer bag of FIG. 11, illustrating a flap extended over an opening of the bag and a side extension secured to a side panel.

With reference to FIGS. 11 and 12, another mailer bag 210 is provided in accordance with the present disclosure. The mailer bag 210 is similar to the mailer bag 10 detailed above with like elements labeled with a similar label with a "2" preceding the previous label and will not be detailed herein for brevity. The mailer bag 210 includes a front panel 212, a rear panel 214, first side panel 216, a second panel 218, and a bottom panel 220 that are joined together by stitching, gussets, adhesives, welding, or other similar methods of joining to form a carrying volume 222.

The mailer bag 210 includes a flap 236 configured to extend across and close an opening 224 of the mailer bag 210, which is opposite the bottom panel 220. The flap 236 includes a first end portion 238, a second end portion 240, a first side flap or extension 262, and a second side flap or extension 264. The first end portion 238 is attached to the rear panel 214 and the second end portion 240 is securable to the front panel 212. The front panel 212 includes a first tape layer 230 and a second tape layer 234 that are releaseably attached to the front panel 212. The second end portion 240 of the flap 236 may be secured to the front panel 212 by the second tape layer 234.

The first side panel 216 may include a third tape layer 266 and the second side panel 218 may include a fourth tape layer (not explicitly shown). The third and fourth tape layers 266 are adjacent a top edge 217 of the respective side panel 216, 218.

The first side extension 262 extends from a first side edge 237 of the flap 236 and the second side extension 264 extends from a second side edge 239 of the flap 236. In embodiments, the first and second side extensions 262, 264 extend from portions of the first and second side edges 237, 239 disposed between the first and second end portions 238, 240 of the flap 236. The flap 236 may include tear strips 265 along the first and second side edges 237, 239 where the first and second side extensions 262, 264 meet the first and second side edges 237, 239. The tear strips 265 may form a continuous tear strip with a tear strip 248 between the second end portion 240 and a main portion of the flap 236 and/or a tear strip 248 between the first end portion 238 and the main portion of the flap 236.

The first and second side extensions 262, 264 are configured to cover a gap G between the flap 236 and a respective one of the first or second side panels 216, 218 to prevent tampering with contents in the carrying volume 212 when the mailer bag 210 is sealed for mailing. As shown, the mailer bag 210 is sealable without pinching a top portion of the front and rear panels 212, 214 together such that the mailer bag 210 remains substantially cuboidic in shape, i.e., a three-dimensional shape having six rectangular surfaces. The first and second side extension 262, 264 may allow for mailer bags having side panels 216, 218 having a dimension along the bottom panel 220 greater than eight inches. For example, the side panels 216, 218 may have a dimension along the bottom portion 220 in a range of about 8 inches to about 24 inches.

With continued reference to FIGS. 11 and 12, the use of the mailer bag 210 to ship one or more items and then to convert the mailer bag 210 into a tote is described in accordance with the present disclosure. The mailer bag 210 may be provided in a flat, folded configuration such that handles 258 of the mailer bag 210 are disposed within a carrying volume 222 of the mailer bag 210. The mailer bag 210 is unfolded such that the carrying volume 222 is accessible through the opening 224. The item or items to be shipped are placed within the carrying volume 222. The item or items may be wrapped in protective packaging. In some embodiments, a cooling medium, e.g., dry ice, may be secured in an internal pocket 272 of the mailer bag 210 before or after the item(s) is placed in the carrying volume 222.

With the item(s) to be shipped are placed within the carrying volume 222, a closure mechanism 225 may be used to close the opening 224 of the mailer bag 210. The closure mechanism 225 may be a zipper, string and eyelets, a hook and loop fastener system, or another suitable closure mechanism. The flap 236 is then folded over the opening 224 and the second end portion 240 is secured to the second tape strip 234. To secure the second end portion 240 to the second tape strip 234, a protective layer 244 may be removed from over an adhesive strip 242 to expose the adhesive strip 242 which is subsequently pressed into the second strip 234 and/or the front panel 212.

The first and second side extensions 262, 264 are then folded over the respective first or second side panel 216, 218 and secured to the respective one of the third or fourth tape strip 266. The first and/or second side extensions 262, 264 may include an adhesive strip and protective layer similar to the adhesive strip 242 and protective layer 244. The first and second side extension 262, 264 further protect access to the carrying volume 222 when the mailer bag 210 is in transit while allowing the mailer bag 210 to remain in a substantially cuboidic shape.

The mailer bag 210 may be labeled and shipped in a manner similar to the mailer bag 20 detailed above.

When the mailer bag 210 is received, the first side extension 262, second side extension 264, and/or the flap 236 may be pulled to open the mailer bag 210. Specifically, as the respective one of the extensions 262, 264 or the flap 236 is pulled, the tear strips 246, 248, 265 may rip to allow for access to the carrying volume 222. When the mailer bag 210 includes a closure mechanism 225, the closure mechanism 225 may prevent access to the carrying volume 222 and may also need to be opened, e.g., unzipped, to access the carrying volume 222 after the tear strip or strips 246, 248, 265 are ripped. The tear strips 246, 248, 265 are designed to be able to withstand the rigors of being shipped and to be easily ripped when force is directly applied along or adjacent the respective tear strip 246, 248, 265. In addition, the tear strips 246, 248, 265 are configured rip such that a clean edge remains after the tear strip 246, 248, 265 is ripped. Such a clean edge may be aesthetically preferred to a jagged edge when the mailer bag 210 is reused.

With the carrying volume 222 accessible through the opening 224, the contents may be removed from the carrying volume 222. The mailer bag 210 may then be converted to reusable tote by removing the first, second, third, and/or fourth tape strips 230, 234, 266 from the respective panel to remove any remaining portions of the flap 236, first side extension 262, and/or second side extension 264 from the mailer bag 210. The handles 258 may then be pulled from within the carrying volume 222 such that the mailer bag 210 is converted into a reusable tote. As a reusable tote, the closure mechanism 225 may be used to close the carrying volume 222.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A method of shipping reusable mailer bag, comprising:
    inserting an item to be shipped through an opening of a mailer bag and into a carrying volume of the mailer bag, the carrying volume defined by a front panel, a rear panel, first and second side panels, and a bottom panel substantially opposite the opening, the mailer bag having a first handle secured to the front panel and a second handle secured to the rear panel, the first and second handles configured to extend through the opening;
    extending a flap across the opening with the first and second handles disposed within the carrying volume of the mailer bag, the flap releasably secured to the front panel of the mailer bag such that a portion of the flap is configured to be removed from the mailer bag after shipping;
    folding a first side extension downward over a first side panel to adhere the first side extension to the first side panel; and
    folding a second side extension downward over a second side panel to adhere the second side extension to the second side panel.

2. The method according to claim 1, further comprising: applying a shipping label to the front panel of the mailer bag.

3. The method according to claim 2, wherein the shipping label is secured to a removable tape layer attached to the front panel of the mailer bag.

4. The method according to claim 1, wherein extending the flap across the opening includes securing a first portion of the flap to the front panel of the mailer bag and securing a second portion of the flap to the rear panel of the mailer bag.

5. The method according to claim 4, wherein securing the second portion of the flap to the rear panel of the mailer bag includes the second portion being secured to a removable tape layer releasably attached to the rear panel of the mailer bag.

6. The method according to claim 1, wherein extending the flap across the opening includes securing a first portion of the flap to the front panel of the mailer bag with a second portion of the flap secured to the rear panel, the flap including a tear strip adjacent the second portion of the flap, the tear strip configured to create a smooth edge when the flap is torn along the tear strip to separate the second portion from the remainder of the flap.

7. The method according to claim 1, wherein extending the flap across the opening includes removing a protective layer from an adhesive strip of the first portion to expose the adhesive strip.

8. The method according to claim 1, further comprising: shipping the mailer bag to a user after extending the flap across the opening, the mailer bag configured to be converted into a tote when received by a user.

9. The method according to claim 1, further comprising: closing the opening with a closure mechanism after inserting the item to be shipped through the opening and before extending the flap across the opening.

10. A method of shipping reusable mailer bag, comprising:
    inserting an item to be shipped through an opening of a mailer bag and into a carrying volume of the mailer bag;
    closing the opening of the mailer bag;

folding a first side extension of the reusable mailer bag downward over a first side panel of the reusable mailer bag to adhere the first side extension to the first side panel;

folding a second side extension of the reusable mailer bag downward over a second side panel of the reusable mailer bag to adhere the second side extension to the second side panel; and shipping the mailer bag to a user, the mailer bag configured to protect the item during shipping and to convert into a tote after being received by the user.

11. The method according to claim 10, further comprising: securing a cooling medium in an internal pocket of the mailer bag separate from the carrying volume, the cooling medium configured to maintain a temperature of the carrying volume below a desired temperature during shipping.

12. The method according to claim 10, wherein closing the opening of the mailer bag includes maintaining the mailer bag in a substantially cuboidal shape.

13. The method according to claim 10, wherein closing the opening of the mailer bag includes extending a flap from a rear panel of the mailer bag, across the opening, and securing a portion of the flap to a front panel of the mailer bag opposite the rear panel.

14. The method according to claim 10, further comprising: extending a flap from a rear panel of the mailer bag, across the opening, and securing a portion of the flap to a front panel of the mailer bag opposite the rear panel.

15. A method of shipping reusable mailer bag, comprising:

closing an opening of the mailer bag to secure an item disposed within a carrying volume of the mailer bag within the carrying volume;

folding a first side extension of the reusable mailer bag downward over a first side panel of the reusable mailer bag to adhere the first side extension to the first side panel;

folding a second side extension of the reusable mailer bag downward over a second side panel of the reusable mailer bag to adhere the second side extension to the second side panel; and shipping the mailer bag to a user, the mailer bag configured to protect the item during shipping and to convert into a tote after being received by the user.

16. The method according to claim 15, wherein closing the opening of the mailer bag includes extending a flap from a rear panel of the mailer bag, across the opening, and securing a portion of the flap to a front panel of the mailer bag opposite the rear panel.

17. The method according to claim 16, wherein closing the opening of the mailer bag includes manipulating a closure mechanism of the mailer bag to close the opening before extending the flap across the opening, the closure mechanism reusable to close the opening after the mailer bag is converted to a tote.

* * * * *